(12) United States Patent
Barthelme et al.

(10) Patent No.: US 12,173,753 B2
(45) Date of Patent: Dec. 24, 2024

(54) BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 44 days.

(21) Appl. No.: 17/824,928

(22) Filed: May 26, 2022

(65) Prior Publication Data
US 2022/0389965 A1 Dec. 8, 2022

(30) Foreign Application Priority Data

Jun. 8, 2021 (DE) .......................... 102021205786.1

(51) Int. Cl.
*F16C 33/58* (2006.01)
*F16C 19/16* (2006.01)
*F16C 35/04* (2006.01)
*F16C 35/067* (2006.01)
*F16C 35/077* (2006.01)

(52) U.S. Cl.
CPC ............ *F16C 33/583* (2013.01); *F16C 19/16* (2013.01); *F16C 35/045* (2013.01); *F16C 35/067* (2013.01); *F16C 35/077* (2013.01)

(58) Field of Classification Search
CPC ...... F16C 19/16; F16C 33/583; F16C 35/047; F16C 35/067; F16C 35/077; F16C 2220/04; F16C 2220/06; F16C 2220/24
See application file for complete search history.

(56) References Cited

U.S. PATENT DOCUMENTS

| | | | |
|---|---|---|---|
| 2005/0189193 A1* | 9/2005 | Ikeda | F16D 41/067 192/110 B |
| 2017/0045088 A1* | 2/2017 | Gluck | F16C 41/007 |
| 2017/0114833 A1* | 4/2017 | Herbst | F16C 19/06 |
| 2018/0135701 A1* | 5/2018 | Krause | F16C 35/042 |
| 2018/0347622 A1* | 12/2018 | Turmeau | F16C 11/068 |
| 2020/0346416 A1* | 11/2020 | Song | B29C 66/721 |

FOREIGN PATENT DOCUMENTS

DE 102017100572 A1 * 3/2018

OTHER PUBLICATIONS

Machine Translation of DE-102017100572-A1 (Year: 2018).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing assembly includes a bearing unit configured to support a rotatable component relative to a stationary component, the bearing unit including a stationary bearing ring and a rotatable bearing ring, the rotatable bearing ring being connectable to the rotatable component and the stationary bearing ring being connectable to the stationary component such that the stationary bearing ring and the stationary component are rotationally fixed. The stationary component or a connecting element between the stationary component and the stationary bearing ring comprises a plurality of layers which may be formed by an additive manufacturing process. Also a method of forming the bearing assembly.

11 Claims, 2 Drawing Sheets

BEARING ASSEMBLY

CROSS-REFERENCE

This application claims priority to German patent application no. 10 2021 205 786.1 filed on Jun. 8, 2021, the contents of which are fully incorporated herein by reference.

TECHNOLOGICAL FIELD

The present invention relates to a bearing assembly including a bearing unit in which a bearing carrier or connecting element in contact with a ring of the bearing is formed in layers.

BACKGROUND

Rolling-element bearings can be used for supporting rotating components with respect to stationary components, for example as a non-locating or locating bearing for supporting a rotating shaft in a housing. Here the bearing rings are connected to the rotating component and to the stationary component, e.g., the housing and the shaft, such that this connection remains as constant as possible under all operating states and environmental conditions of the application. Thus, for example, a preinstalled bearing can be overmolded directly with the housing or a housing part. This does provide a fixed connection between the bearing and the housing or housing part; however damage to the bearing can arise that can be caused by high temperatures and/or high pressures during the overmolding process.

SUMMARY

It is therefore an aspect of the present disclosure to provide a bearing assembly that can be installed in a stationary component without damage due to high temperatures or pressures.

The disclosed bearing assembly includes a bearing unit that is configured to support a rotating component relative to a stationary component. The bearing unit includes a first stationary bearing ring and a second rotatable bearing ring, wherein the rotatable bearing ring is connectable to the rotating component, and wherein the stationary bearing ring is connectable to the stationary component, in particular a bearing carrier, such that they are rotationally fixed.

The bearing assembly can serve both as a non-locating bearing and as a locating bearing. With an implementation as a locating bearing, the stationary bearing ring is connected to the stationary component such that not only are they rotationally fixed, but also such that they are axially fixed. With an implementation as a non-locating bearing, the stationary bearing ring is indeed connected to the stationary component such that they are rotationally fixed, but the stationary bearing ring is also axially displaceable in order to be able to compensate for thermal expansion.

In both cases the rotatable bearing ring is fixedly connectable to the rotating component. Such a fixed connectability can be brought about, for example, by snap rings or a press fit.

The stationary component can be, for example, a housing. Alternatively the stationary component can be a bearing carrier that is fixedly connectable to the housing, wherein in turn the stationary bearing ring is attached in the bearing carrier such in an essentially fixed manner, but under certain circumstances so that it is axially displaceable. It is advantageous here in particular when the bearing assembly is provided as a preassembled unit made of a bearing carrier and a bearing unit. The entire bearing assembly can thereby easily be attached to the housing without the tolerances of the individual components having to be set separately and laboriously during installation.

In order to allow a connection of the bearing unit to the stationary component, in particular the bearing carrier, without damage to the bearing unit, the stationary component or the bearing carrier and/or a connecting element between the stationary component and the stationary bearing ring have a layer construction.

It is to be noted here that in the sense of this disclosure the connecting element does not represent a bearing carrier but rather is a structure that is only used to connect the stationary component, such as, for example, the bearing carrier, to the stationary bearing ring. Thus, for example, the connecting element can simply be injected between the bearing ring and the bearing carrier or the stationary component so that an attachment between the connecting element and the stationary component or the bearing ring is achieved.

Furthermore, it is to be noted that here the bearing unit does not function as an insert part in an overall injection-molding process of the stationary component, but rather the bearing unit is connected to the stationary component via a connecting element assembled layer by layer, or the stationary component is built up layer by layer on the bearing ring. Due to the layer-wise construction, the pressure that acts on the bearing unit can be reduced, since only a thin layer is always applied in the axial and/or radial direction. On the other hand, the bearing unit is only heated at the surface, since such a thin layer can emit little heat in comparison to the entire bearing unit.

Due to the overmolding, the bearing unit is embedded into the stationary component, in particular the bearing carrier or the connecting element, in an interference or friction fit manner. If the stationary component is the bearing carrier, it can in turn be attached to a housing or the like via attachment means. The connecting element can also be connected to the stationary component, in particular the bearing carrier, in a friction fit and/or interference fit manner, e.g., by overmolding.

At the same time the negative influences, due to the manufacturing of the stationary component or of the connecting element by high temperatures and pressures are limited to a very small region of the bearing unit to be enclosed. This is the case since always only one layer after the other is manufactured or applied onto the bearing unit, and thus the pressure and the temperature heating act on the bearing unit only to a smaller penetration depth.

A further advantage is that the bearing unit can be completely preassembled since due to the layer construction a thermal influencing or impairing of the bearing components is prevented.

If, as described above, a connecting element is provided between the stationary component and the stationary bearing ring, the stationary component can be premanufactured, for example by a conventional injection molding process. This simplifies the manufacturing of the stationary component. The connecting element can subsequently be introduced layer-wise between the bearing unit and the stationary component. The retaining function between the bearing unit and the connecting element and/or the stationary component and the connecting element can optionally be provided by interference-fit elements. In this case the influence of temperature and pressure on the bearing unit can also be reduced, since only the "small-part" connecting element is directly connected to the bearing ring. Alternatively the stationary component can be formed, for example, sprayed, around the connecting element. In this case the influence of temperature and pressure on the bearing unit is also reduced since the connecting element serves as a type of buffer between the stationary component and the bearing unit and can receive temperatures and pressures that would otherwise act directly on the bearing unit.

According to one embodiment, the layer construction is produced by a 3D printing method, a layer-wise spraying, or a laminating. The layer-type material construction can be manufactured by various 3D printing methods, also called additive manufacturing or rapid prototyping, wherein the material is applied layer by layer, and the three-dimensional connecting element or stationary component is thus generated. These include, for example, fused deposition modeling (FDM), selective laser melting (SLM), stereolithography (SL), or electron beam melting (EBM). Alternatively a layer-wise injection-molding process wherein the connecting element or the stationary component is sprayed in layers or a laminating wherein a plurality of surfaces of the same material or also different materials are adhered to each other can be used.

These methods have the advantage that with such a layer-type construction, high pressure is not necessary, whereby damage to the bearing unit can be prevented. Furthermore, the adverse temperature effect of the bearing unit is very low since they are methods wherein only a small region is heated, and therefore the bearing unit is only slightly heated. Furthermore, for the layer-wise construction by 3D printing methods, layer-wise spraying, or laminating, no product-specific tools are necessary, whereby the tool costs can be minimized, and fast manufacturing times can be realized.

According to one embodiment, the layer construction can be layers of the same material. This means that the complete stationary component or the entire connecting element is manufactured from a single material. However, it is not manufactured from one casting, as is the case with conventional injection-molding methods, but rather is realized by a plurality of layers applied one atop the other.

Alternatively the layer construction can be comprised of layers of different materials. In this case, for example, reinforcing layers made of carbon fibers or the like can be introduced into the stationary component, in particular the bearing carrier or the connecting element.

According to a further embodiment, further elements are embedded in the layer construction. These elements can be inlays, attachment means, sleeves, nuts, or the like. Electrically conducting elements can also be introduced into the layer construction, which electrically conducting elements can be used, for example, for grounding the stationary bearing ring by electrical contact with the stationary component. This has the advantage that already during the manufacturing of the layer construction, further elements can be integrated directly without a further subsequent step being required for this purpose.

The layers of the layer construction can be disposed one atop the other in the axial and/or radial direction. The orientation of the layers can be adapted to the respective application or the manufacturing. An axial construction is particularly preferred, since in this case the respective layer only comes into contact with the bearing unit by its edge region. The heat input from the layer into the bearing unit as well as the exerted pressure is thereby minimized.

According to a further embodiment, the stationary component, in particular the bearing carrier, and/or the connecting element are formed from a plastic, in particular a thermoplastic and/or a thermoset, and/or from a metal, in particular a light metal alloy. These materials have the advantage that they can be applied in the form of a layer construction in order to form the stationary component, in particular the bearing carrier, and/or the connecting element.

Thermosets are hard polymer materials that are cross-linked three-dimensionally via chemical primary valency bonds. They provide the advantage that they retain their strength in operation even with heat, and have a low thermal expansion, which leads to a high dimensional stability. Indeed thermosets must be processed at a high temperature, in particular cured, but since the application is effected in layers, only a low heat input into the bearing unit occurs so that despite the high processing temperature, no damage to the bearing unit occurs. This applies likewise for light metal alloys that are also hot-processed, but due to the layer construction cause no damage to the bearing unit.

Thermoplastics have the advantage that they can be processed at lower temperatures than thermosets, which further reduces the negative impact on the bearing unit by high temperatures during the manufacturing of the stationary component or of the connecting element.

The stationary component or the connecting element can at least partially be disposed on the radially outer surface or the radially inner surface of the stationary bearing ring. If they are disposed on the radially outer surface, the stationary component can be, for example, a housing, or a bearing carrier that is connected to the housing. If they are disposed on the radially inner surface of the stationary bearing ring, the stationary component can be, for example, a hub, or a bearing carrier that is connected to the hub.

If the stationary component or the connecting element are disposed only partially on the radially outer surface or the radially inner surface of the stationary bearing ring, the effect of high temperatures and pressures is reduced still further, since the complete radially outer or radially inner surface of the bearing unit no longer comes into contact with the stationary component or the connecting element.

According to a further embodiment, the stationary component and/or the connecting element and/or the bearing ring include at least one (axial) securing element. Depending on the arrangement, the securing element can provide an interference fit between the stationary component and the connecting element, between the connecting element and the bearing ring, or between the stationary component and the bearing ring. Due to such securing elements the connection between the stationary component and the bearing ring can be improved, optionally with connecting elements disposed therebetween.

Another embodiment comprises a method of forming a bearing assembly that includes placing a bearing unit having a first ring and a second ring and a plurality of rolling elements between the first ring and the second ring on a support surface and applying a plurality of layers of material to the support surface such that each layer contacts and extends radially outwardly from a radially inner or radially outer surface of the first ring. The method may also include, before applying the plurality of layers of material, placing the bearing unit in an opening in a stationary component. In that case, the applying a plurality of layers comprises applying the plurality of layers in a gap between the first bearing ring and the stationary component such that each of the plurality of layers contacts the stationary component.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
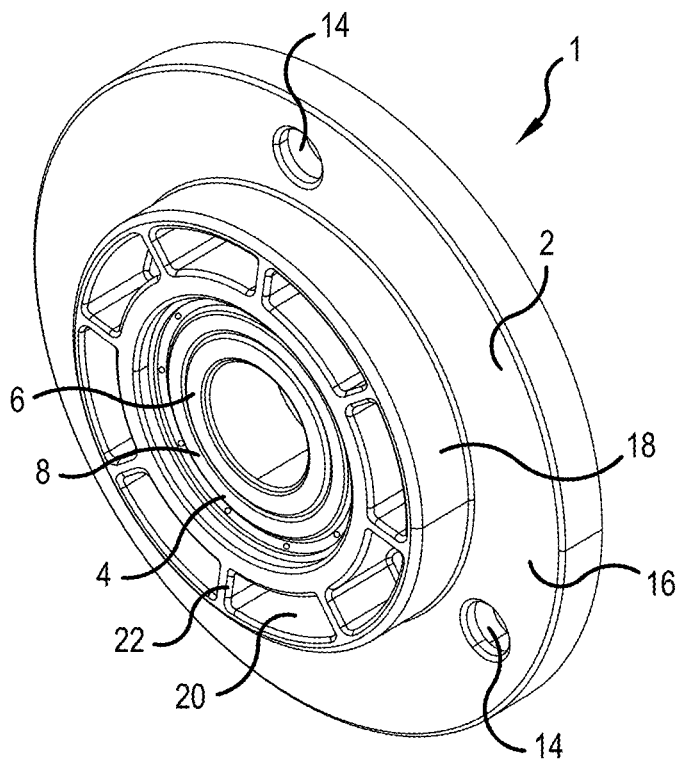
FIG. 1 is a front perspective view of a bearing unit disposed in a bearing carrier according to an embodiment of the disclosure.

In the following, identical or functionally equivalent elements are designated by the same reference numbers.

The appended Figures show preferred exemplary embodiments of a bearing assembly 1 including a bearing carrier 2 in which a bearing unit 4 is disposed that includes an inner ring 6 and an outer ring 8. The exemplary embodiments depicted show a bearing assembly 1 that can be used, for example, for supporting a shaft in a housing, wherein the housing is stationary and the shaft is rotating. Of course, the bearing assembly 1 is also usable in other applications, for example, a stationary pin and a rotating housing.

The inner ring 6 of the bearing unit 4 is configured as a rotatable bearing ring, and the outer ring 8 is configured as a stationary bearing ring and connected to the bearing carrier 2. Between the bearing rings 6, 8, rolling elements 10 are disposed that are guided and held uniformly spaced by a cage 12 (see for this purpose in particular FIGS. 3 and 4).

In the exemplary embodiments depicted, the bearing unit 4 is configured as a ball bearing, but all other types of rolling-element bearings are also possible, such as, for example, roller bearings, or plain bearings.

For attaching to a housing (not depicted), the bearing carrier 2 includes receptacles, in this case through-openings 14, into which attachment means, for example, screws, can be introduced. Other receptacles are also possible, such as, for example, threaded through-stems or separate inserts.

Figure 2:
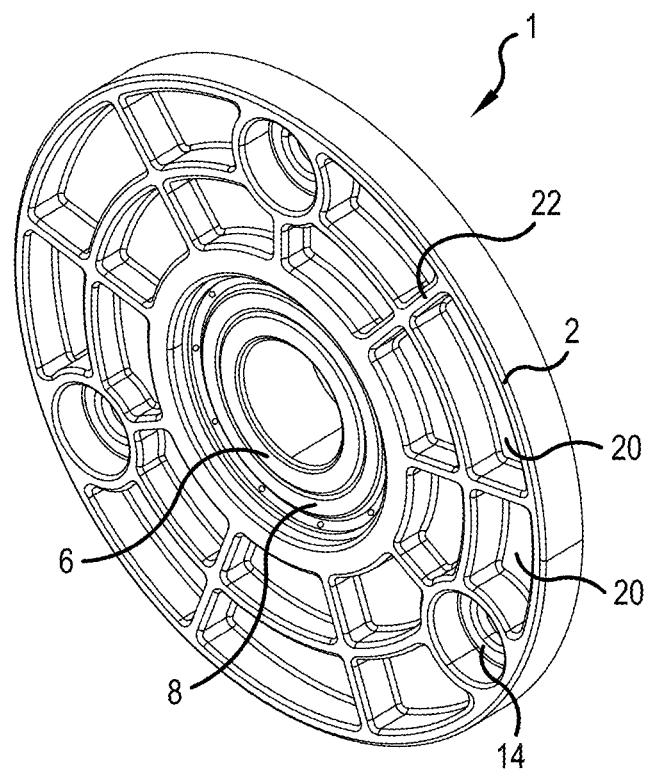
FIG. 2 is a rear perspective view of the bearing unit and bearing carrier of FIG. 1.

In the exemplary embodiments depicted, the bearing carrier 2 includes a flange 16 having the receptacles 14, and a shoulder 18 is disposed in the center of which the bearing unit 4. The flange 16 has a certain thickness in order to make possible a stable attachment to the housing. As is shown in FIG. 2, the flange 16 includes recesses 20 on one side. These serve to make the bearing carrier 2 lighter, while it simultaneously remains stable due to the remaining bridges 22.

In order to simplify the attachment of the bearing unit 4 in the bearing carrier 2, or alternatively directly in the housing, and in particular to avoid impairing the bearing unit 4 due to high temperatures and pressures, the bearing carrier 2, or alternatively the housing, is built with a layer-type material construction 30 around the bearing unit 4, as is described in the following with reference to FIGS. 3 and 4.

Figure 3:
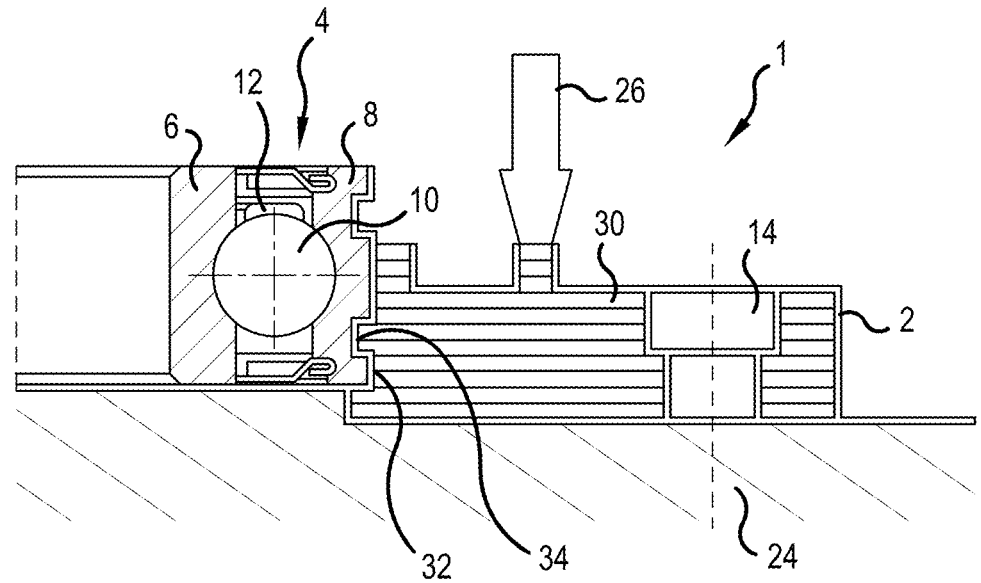
FIG. 3 is a sectional view of a bearing unit disposed in a bearing carrier according to an embodiment of the disclosure.

As is shown in FIG. 3, the bearing unit 4 is disposed on a work table 24. Using a spray head 26, the material layers 30 are then successively applied around the bearing unit 4 in the axial direction of the bearing unit 4. Alternatively a radial layer construction is also possible.

The layers 30 can be applied, for example, by a 3D printing method, a layer-wise spraying, or a laminating. Here the material is applied layer-by-layer, and thus in the embodiment shown in FIG. 3 the three-dimensional bearing carrier 2 is generated. As explained, each layer 30 can include the same material so that the entire bearing carrier 2 is comprised of a single material. Alternatively the layers can also include different materials, such as, for example, additional reinforcing layers.

Due to the layer-wise construction, the pressure that acts on the bearing unit 4 can be reduced, since only a thin layer is always applied, here in the axial direction. On the other hand, the bearing unit 4 is only heated at the surface, since such a thin layer emits little heat in comparison to applying a thick layer of material at one time over the entire bearing unit 4.

During the manufacturing of the bearing carrier 2, axial securing elements 32, 34 can be co-formed, which leads to an interference fit with corresponding elements of the bearing unit 4. Furthermore, receptacles 14 for attachment means for attaching can be formed directly on the housing. Alternatively these receptacles 14 can also be produced later. Furthermore, other elements (not shown), such as, for example, electrically conductive elements, can also be directly co-produced or molded.

Figure 4:
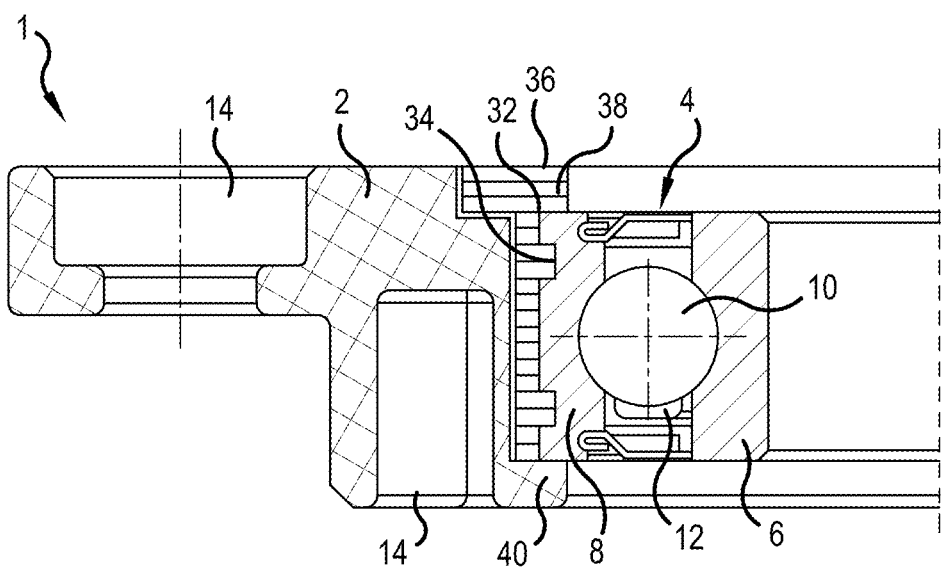
FIG. 4 is a sectional view of a bearing unit disposed in a bearing carrier, including a connecting element, according to another embodiment.

Instead of manufacturing the bearing carrier 2 itself in layer construction, it is also possible to use a connecting element 36, as is depicted in FIG. 4. In this case the bearing carrier 2 can be manufactured in advance as an injection-molded element, and only the connecting element 36 between the bearing carrier 2 and the bearing unit 4 is manufactured with a layer-type material construction.

The connecting element 36 is also formed by an axial material application by a plurality of layers 30 that are disposed between the bearing carrier 2 and the bearing unit 4. Due to the layer-wise construction, both the pressures and the temperature influences on the bearing unit 4 are also reduced.

The use of the connecting element 36 has the advantage that the bearing carrier 2 can already be manufactured in advance by a conventional injection-molding method. The connecting element 36 is subsequently injected between the bearing unit 4 and the premanufactured bearing carrier 2. Alternatively the bearing carrier 2 can be formed later around the connecting element 36. This can also be effected using a conventional injection-molding method, since high temperatures and pressures due to the connecting element 36 are kept from the bearing unit 4.

Like the bearing carrier 2 of FIG. 3, the connecting element 36 can also include axial securing elements 32, 34 that interact with corresponding elements of the bearing unit 4. In the embodiment depicted, the securing elements 32, 34 are provided on the outer diameter of the bearing ring 8. In addition, further axial securing elements 38 can be provided on one and/or both side surfaces of the bearing ring 8. In the embodiment shown in FIG. 4, it is thereby realized that a side surface of the outer ring 8 is axially surrounded with material of the connecting element 30.

A connecting of the connecting element 36 to the bearing carrier 2 is effected here primarily by friction and interference fit, for example, by overmolding. As is shown in FIG. 4, the interference fit can be realized by a flange 40 that secures the connection between the connecting element 36 and the bearing carrier 2. Still further securing elements can be provided that preferably act in two (upward and downward) or three directions (upward, downward, and circumferentially).

In summary, due to the bearing assembly proposed here a simple attaching of a bearing unit including a stationary component, in particular a bearing carrier, is made possible without the manufacturing of the stationary component having a negative influence on the bearing unit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Bearing carrier
4 Bearing unit
6 Inner ring
8 Outer ring
10 Rolling element
12 Cage
14 Receptacles
16 Flange
18 Shoulder
20 Recesses
22 Bridges
24 Work table
26 Spray head
30 Material layers
32, 34 Axial securing elements
36 Connecting element
38 Axial securing element
40 Flange

What is claimed is:

1. A method of forming a bearing assembly comprising:
    placing a bearing unit having a first ring and a second ring and a plurality of rolling elements between the first ring and the second ring on a support surface; and
    forming in place a plurality of layers of material that contact and extend radially outwardly away from a radially inner or radially outer surface of the first ring,
    wherein at least two layers of the plurality of layers are formed of different materials.

2. The method according to claim 1,
    including, before forming in place the plurality of layers of material, placing the bearing unit in an opening in a stationary component,
    wherein the applying a plurality of layers comprises applying the plurality of layers in a gap between the first bearing ring and the stationary component such that each of the plurality of layers contacts the stationary component.

3. The method according to claim 2,
    wherein the stationary component is a bearing carrier.

4. The method according to claim 2, wherein the stationary component is formed from a thermoplastic or a thermoset, or a metal alloy.

5. The method according to claim 2, wherein the plurality of layers are formed in place by spraying or 3D printing.

6. The method according to claim 2,
    wherein each of the plurality of layers comprises a disk having a radially inner surface in direct contact with the stationary bearing ring and a radially outer surface in direct contact with the stationary component.

7. The method according to claim 2,
    wherein the radially outer surface of the stationary bearing ring includes a projection or a recess.

8. The method according to claim 1, wherein the plurality of layers are formed in place by spraying or 3D printing.

9. The method according to claim 1,
    wherein each of the plurality of layers comprises a disk having a radially inner or radially outer surface in direct contact with the stationary bearing ring.

10. The method according to claim 1,
    wherein the radially inner or radially outer surface of the stationary bearing ring includes a projection or a recess.

11. The method according to claim 1,
    wherein a first layer of the plurality of layers is formed on the support surface.

* * * * *